United States Patent [19]

Maguire

[11] Patent Number: 5,405,119

[45] Date of Patent: Apr. 11, 1995

[54] SLEEVE ASSEMBLY FOR FORMING OPENINGS IN MOLDED STRUCTURES

[76] Inventor: James V. Maguire, 3700 W. Flamingo, Pahrump, Nev. 89041

[21] Appl. No.: 206,940

[22] Filed: Mar. 7, 1994

[51] Int. Cl.$^6$ .......................... B28B 7/18; E04G 17/06
[52] U.S. Cl. ..................................... 249/183; 249/40; 249/43; 249/184; 249/190; 249/213; 249/216; 249/217; 249/83
[58] Field of Search ................... 249/43, 40, 190, 216, 249/217, 213, 95, 83, 184, 183

[56] References Cited

U.S. PATENT DOCUMENTS

| | | | |
|---|---|---|---|
| 1,767,834 | 6/1930 | Carlson | 249/217 |
| 1,907,618 | 5/1933 | Umbach et al. | 249/217 |
| 1,960,502 | 5/1934 | McMillan | 249/217 |
| 2,411,678 | 11/1946 | Cornella | 249/217 |
| 3,400,182 | 9/1968 | Kolt | 249/216 |
| 3,523,552 | 8/1970 | Ogden | 249/43 |
| 4,079,912 | 3/1978 | Haydock | 249/217 |
| 4,159,099 | 6/1979 | Maguire | 249/217 |
| 4,410,162 | 10/1983 | Wlodkowski et al. | 249/216 |
| 4,598,519 | 7/1986 | Reid | 249/216 |
| 4,625,940 | 12/1986 | Barton | 249/43 |

Primary Examiner—Khanh Nguyen
Attorney, Agent, or Firm—G. Donald Weber, Jr.

[57] ABSTRACT

A sleeve assembly for forming a lined opening in molded structures made from concrete or the like. The sleeve provides the lining. During formation of the structure, the sleeve is held in place by a pair of generally hemispherical end cups having tapering and/or curving surfaces for supporting sleeves of a variety of sizes. The end cups are preferably held in place by a retainer which passes through the sleeve and is connected to the end cups by loose fitting clips which are mounted in the end cups. The sleeve assembly is adapted to be secured between a pair of generally parallel panels between which a molded structure such as a wall is formed.

13 Claims, 1 Drawing Sheet

SLEEVE ASSEMBLY FOR FORMING OPENINGS IN MOLDED STRUCTURES

BACKGROUND

1. Field of the Invention

The present invention relates, generally, to a sleeve assembly for forming a lined opening in molded structures made, for example, from concrete and, more particularly, to such a sleeve assembly which may be arranged between a pair of spaced-apart panels defining surfaces of a molded structure to be formed therebetween.

2. Prior Art

One type of structural construction technique is to use poured concrete or the like. In this technique, portions of such structures are formed with one or more panels (or forms) defining various surfaces of the structure. For example, a vertical concrete wall is generally poured between two spaced-apart, vertically arranged panels. A floor may be similarly formed when concrete (or other material) is poured upon one horizontally arranged panel. The upper surface of the floor is normally finished manually and an upper form or panel is not always required.

In the formation of molded structures, particularly in concrete walls or the like, it is commonly necessary to provide a relatively large number of accurately located and shaped openings to permit the passage of conduits of various types through the finished structure.

It is desirable to be able to form and maintain such openings through the structure in a relatively simple manner which does not interfere with formation of the structure. Some of the problems encountered in this regard include the specific arrangement and shape of the openings to be formed in the structure. For example, the forms or panels may not always be perfectly aligned. Thus, the sleeve may not always be easily installed.

Likewise, the structures may have different thicknesses in any particular job, or from job-to-job. In this case, a large number of sleeves of different lengths is required. This has the disadvantage of a large inventory of sleeves which is cumbersome to store and expensive to maintain. Moreover, it is desirable that an element defining an opening through the structure be capable of simple, and rapid installation between two vertical panels.

PRIOR ART STATEMENT

The best known prior art is U.S. Pat. No. 4,159,099, entitled SLEEVE ASSEMBLY FOR FORMING OPENINGS IN MOLDED STRUCTURES, by J. V. Maguire. This patent describes a sleeve assembly with a unitary sleeve, tapered end cups and a rigid, stabilizing rod centrally disposed in the sleeve and fixedly attached to the end cups, as well as the panels.

SUMMARY OF THE INSTANT INVENTION

The invention comprises a sleeve assembly capable of providing an accurate opening in a molded structure of the type referred to above. In particulars, the sleeve assembly includes an adjustable tubular sleeve designed to remain in place within the molded structure in order to provide a lining for the opening. The tubular sleeve includes a pair of sleeve elements slidably or telescopically mounted on each other. An adjustable positioning device such as a hose clamp is mounted on the outer surface of the inner sleeve element and limits the movement of the sleeve elements relative to each other. The tubular sleeve is positioned relative to the forming panels by means of end cups which have a generally hemispherical surface and which bear against, and adjustably interact with, each end of the tubular sleeve.

In the preferred embodiment of the sleeve assembly adapted for installation between a pair of spaced-apart panels, two such end cups are employed. The two end cups are disposed respectively, at the opposite ends of the tubular sleeve while the sleeve is accurately positioned between the respective panels. The hemispherical surface of the end cups is properly configured to permit engagement with the ends of the tubular sleeves.

The end cups are retained in engagement with the tubular sleeve by a centrally disposed retainer unit which, typically, comprises a resilient band. A connector is joined to each end of the retainer unit. The connector penetrates or engages the respective end cup. The retainer unit and the end cups may be readily removed when the panels are withdrawn from the completed structure. The sleeve remains in the structure thereby producing a lined opening through the structure.

DESCRIPTION OF THE PREFERRED EMBODIMENT

The present invention is particularly directed toward a sleeve assembly 100 for producing a lined opening in molded structures formed of concrete, for example. Typically, such structures comprise a vertical wall, for example, of the type formed between spaced-apart panels 12 and 14 as illustrated in FIG. 1.

Figure 1:
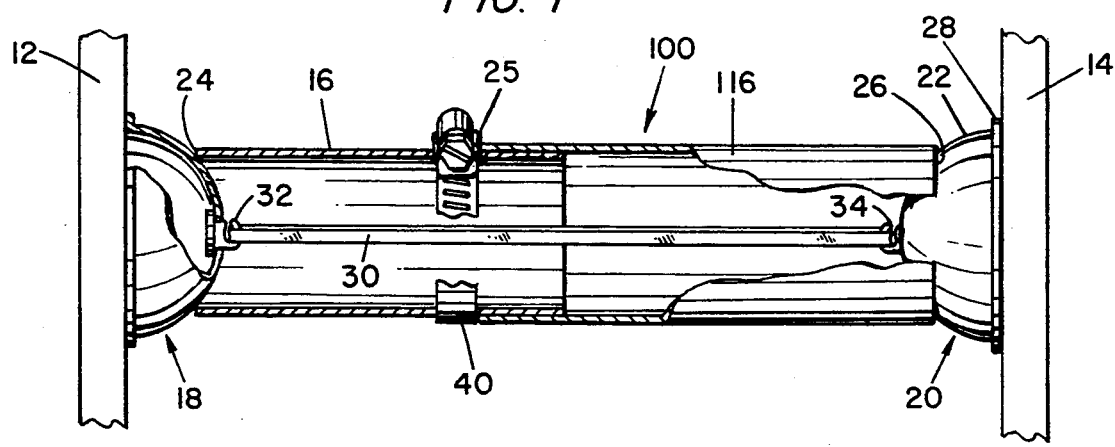
FIG. 1 is a partially sectioned view of a sleeve assembly according to the present invention arranged in place between a pair of spaced-apart panels for forming a molded structure.

Referring particularly to FIG. 1, a sleeve assembly 100 according to the present invention is disposed between a pair of spaced-apart, vertical, forming panels 12 and 14. The panels 12 and 14 are, typically, sheets of plywood or other material arranged to define the opposite surfaces of a structure to be molded therebetween. Typically, when a wall of concrete or the like is formed between two such spaced-apart panels, the panels are erected and the concrete is then poured between them. Reinforcement rods may be utilized in the structure. In the case of the instant invention, the concrete is poured between the panels 12 and 14, and around the sleeve assembly 100. In order to prevent dislocation or deformation of the sleeve assembly 100, it is normally wired or otherwise connected to the conventional reinforcement rods or the like (not shown).

It is particularly desirable that the sleeve assembly 100 be relatively simple and inexpensive while having a design which facilitates installation thereof between the panels which may not be precisely aligned. Also, it is desirable that the sleeve assembly 100 be adjustable in length, particularly if the tubular sleeve forms a lining for an opening to be formed in the molded structure wherein the width of the structure may vary from place-to-place.

To accomplish these purposes, the sleeve assembly 100 of the instant invention includes a pair of concentric, tubular sleeves 16 and 116, a clamp 40, a pair of adjustable end cups 18 and 20, and a retainer 30 for maintaining the end cups in adjustable contact with the ends of the sleeves.

In this embodiment, the tubular sleeves 16 and 116 are preferably formed from thin-walled material, such as galvanized metal, and have a relatively large inside diameter. Of course, the tubular sleeves 16 and 116 may be formed from any sufficiently strong, rigid material such as cast iron pipe, cardboard or the like.

A pair of hemispherical end cups 18 and 20 are arranged at opposite ends of the interlockingly connected sleeves 16 and 116 for engagement with the respective panels 12 and 14. Each of the end cups 18 and 20 has a generally hemispherically shaped surface 22 and a planar rim 28. The surface 22 of each end cup is adapted to bear against the respective ends 24 and 26 of the tubular sleeves 16 and 116. Conversely, the rim 28 of each end cup is adapted to bear against the respective panel 12 or 14.

Retainer 30 is attached to one of the end cups, for example cup 24, by a suitable connector 32. The retainer 24 is passed axially through the interlocking sleeves 16 and 116. The retainer 30 (a large rubber band, for example) is stretched until it is attached to the other end cup by another suitable connector 34 at the other end of the compound sleeve assembly. The retainer 30 is then permitted to contract and pull both of the end cups into engagement with the respective ends of the sleeves. The end cups are now adjustably mounted to the sleeve assembly.

The two concentric sleeves 16 and 116 are able to slide smoothly relative to one another. The sleeves are generally of similar length (although not so limited). The sleeves 16 and 116 can be adjusted so that the overall length is less than the distance between the spaced apart panels 12 and 14. In this condition, the sleeves are inserted between the panels. The clamp 40, in the form of a hose clamp or the like, is initially placed somewhat loosely on the outer surface of the inner sleeve 16. When the sleeves have been adjusted to a preferred overall length (typically after insertion between panels 12 and 14), the clamp 40 is tightened to the outer surface of the inner sleeve 16. Thus, the clamp 40 is substantially fixed relative to the inner sleeve 16. Conversely, the end 25 of the outer sleeve 116 abuts against clamp 40 and is prevented from moving in one direction. Thus, clamp 40 acts as a stop.

Thus, with the end cups 18 and 20 accurately located relative to the panels 12 and 14, the interlocking tubular sleeves 16 and 116 also tend to remain accurately positioned during formation of the molded structure. The rounded surfaces 22 of the respective end cups 18 and 20 are able to receive and bear against the ends of tubular sleeves of different sizes. The adjustable sleeve assembly 100 is then anchored in place, for example in the re-bar of the forming structure.

It will be apparent that different types of sleeves and sizes of sleeves may be accurately positioned and maintained by the same end cups. The hemispherical end cups tend to form a shaped opening in the molded concrete structure following removal of the panels 12 and 14 and all components of the sleeve assembly except for the clamp 40 as well as the sleeves 16 and 116. After a conduit or the like is arranged within the opening formed in the molded structure (see FIG. 2), the ends of the opening may be grouted in order to seal the opening through the structure if so desired.

In order to facilitate removal of the end cups 18 and 20, the surfaces 22 thereof are preferably smooth. Typically, the end cups can be fabricated of aluminum, sheet metal or the like. These can be formed, molded, or spun, for example. Alternatively, the end cups 18 and 20 may also be made of a somewhat resilient compound formed from a plastic material or the like having a generally smooth or waxy surface in order to further facilitate the release thereof from the molded structure. The surfaces 22 are substantially hemispherical and form an angle with an approximate range of 180 degrees while preferably having a slightly flattened base in order to accurately maintain the position of the tubular sleeve 16.

As noted above, the tubular sleeves 16 and 116 remain accurately located between the panels 12 and 14 as determined by the position of the end cups 18 and 20. The end cups are positioned relative to the sleeves by means of the central retainer 30 which extends through the tubular sleeves 16 and 116 and is joined to connector elements 32 and 34.

During the arrangement of forming panels for vertical concrete walls or the like, one panel such as that indicated at 12 in FIG. 1 may be mounted in place with all re-bar and other hardware being arranged adjacent to that panel prior to erection of the spaced apart panel 14. The construction of the present sleeve assembly is also contemplated to facilitate its use in such a situation. In particular, the sleeve assembly, with all of its components is secured in place between the panels before or after they have both been erected. However, because of the slidably, interlocking sleeves 16 and 116 it is not necessary to have a large inventory of sleeves of various lengths.

It is further contemplated that a variety of sleeve assemblies be provided particularly having end cups 18 and 20 of different diameters in order to accommodate sleeves of widely varying diameters, for example from 2½ to 8 inches. However, since the surfaces of each sleeve assembly 100 will engage and position sleeves of different sizes, only a limited number of different sleeve assemblies need be made available to accommodate a wide variety of sleeve sizes.

The use of a pair of telescoping tubular sleeves is particularly desirable since the assembly can be adjusted to any appropriate length to fit between the panels 12 and 14. The retainer 30 is formed of resilient material in order to accommodate different spacing between the panels 12 and 14.

Figure 2:
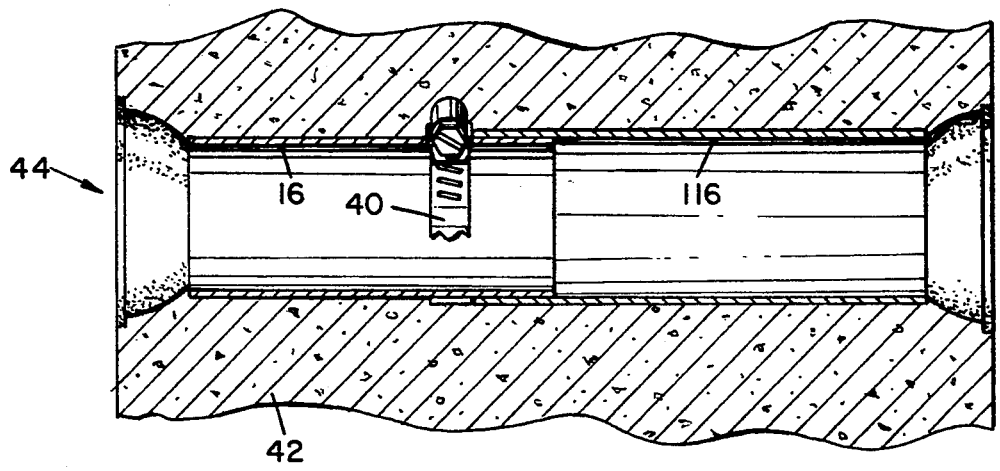
FIG. 2 is a view of the molded structure of FIG. 1 with the forming panels and sleeve assembly removed except for the tubular sleeve which forms a lining for an opening through the structure.

Referring now to FIG. 2, there is shown a cross-sectional view of a lined opening 44 through a structure 42. The molded structure is generally indicated at 42. This structure represents the concrete or the like that was poured between the panels 12 and 14 (see FIG. 1) to form the molded structure. The opening through the structure formed by the sleeve assembly 100 is generally indicated at 44. The panels 12 and 14 have been removed, along with components of the sleeve assembly 100. However, the tubular sleeves 16 and 116, as well as the clamp 40 remain in situ. The sleeves 16 and 116 are left within the molded structure to form a lining along a substantial portion of the opening through the structure as illustrated in FIG. 2.

Thus, there is shown and described a unique design and concept of a sleeve assembly capable of providing an opening in molded structures. The particular configuration shown and described herein relates to such an assembly which includes a tubular sleeve which may remain in place within the molded structure to form a lined opening therethrough. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

It is claimed:

1. A sleeve assembly for forming a lined opening in a molded structure comprising,
   a tubular sleeve apparatus comprising a plurality of concentric sleeves,
   a pair of sleeve positioning elements,
   each of said sleeve positioning elements having a surface for selectively bearing against a respective end of said tubular sleeve apparatus,
   a resilient retainer means extending axially through said concentric sleeves, and
   securing means attached to said resilient retainer means for selectively securing said sleeve positioning elements against the ends of said tubular sleeve apparatus.

2. The sleeve assembly of claim 1 wherein,
   said resilient retainer means, said sleeve positioning elements and said securing means are separable and removable from the molded structure to form a passage therethrough which is lined said tubular apparatus.

3. The sleeve assembly of claim 1 wherein,
   said pair of sleeve positioning elements define surfaces which are approximately hemispherical in configuration.

4. The sleeve assembly of claim 3 wherein,
   said surfaces of said sleeve positioning elements are formed from material which is readily releasable from the molded structure.

5. The sleeve assembly recited in claim 1 wherein,
   at least one of said sleeve positioning elements includes a bearing surface at an outer edge thereof.

6. The sleeve assembly recited in claim 1 wherein,
   said plurality of concentric sleeves are slidable relative to each other.

7. The sleeve assembly recited in claim 6 wherein,
   each of said concentric sleeves is open at both ends.

8. The sleeve assembly recited in claim 1 including,
   stop means mounted on the outer surface of a first concentric sleeve in order to limit movement of any concentric sleeve which is disposed external to said first concentric sleeve.

9. The sleeve assembly recited in claim 8 wherein,
   said stop means comprises clamp means.

10. The sleeve assembly recited in claim 9 wherein,
    said clamp means comprises a hose clamp which surrounds said first concentric sleeve.

11. The sleeve assembly recited in claim 1 wherein,
    said resilient retainer means comprises an elastic band.

12. The sleeve assembly recited in claim 1 wherein,
    said securing means comprise hook means which extends through the surface of each of said sleeve positioning elements.

13. The sleeve assembly recited in claim 1 wherein,
    a portion of each of said sleeve positioning elements extends into said tubular sleeve apparatus.

* * * * *